United States Patent [19]

Thompson et al.

[11] Patent Number: 4,881,166

[45] Date of Patent: Nov. 14, 1989

[54] METHOD FOR CONSISTENT MULTIDATABASE TRANSACTION PROCESSING

[75] Inventors: Glenn R. Thompson, Tulsa, Okla.; Yuri J. Breitbart, Lexington, Ky.

[73] Assignee: Amoco Corporation, Chicago, Ill.

[21] Appl. No.: 78,129

[22] Filed: Jul. 24, 1987

[51] Int. Cl.⁴ .............................................. G06F 9/00
[52] U.S. Cl. ................................. 364/200; 364/282.4; 364/282.2; 364/268.1
[58] Field of Search ... 364/200 MS File, 900 MS File

[56] References Cited

U.S. PATENT DOCUMENTS 4,627,019 12/1986 Ng ........................................ 364/900

OTHER PUBLICATIONS

Breitbart et al, "ADDS-Heterogeneous Distributed Database System", Distributed Data Sharing Systems, 1985, pp. 7-24.

*Primary Examiner*—Gareth D. Shaw
*Assistant Examiner*—John G. Mills
*Attorney, Agent, or Firm*—Scott H. Brown; Fred E. Hook

[57] ABSTRACT

Disclosed is a concurrency control method and related system for permitting the correct execution of multiple concurrent transactions, each comprising one or more read and/or write operations, in a heterogeneous distributed database system. Read and write operations are processed at the required sites if no site cycles are detected. If any site cycles are detected in a read operation, then new sites are searched for. If any site cycle is detected for any of the sites for a write operation, then the transaction is aborted.

11 Claims, 7 Drawing Sheets

METHOD FOR CONSISTENT MULTIDATABASE TRANSACTION PROCESSING

BACKGROUND OF THE INVENTION

1. Field of the Invention

The present invention relates to a concurrency control method and related system for use with database management systems and, more particularly, to such a concurrency control that is used to ensure the correct execution of multiple concurrent global transactions in a heterogeneous distributed database system in the presence of local transactions that are outside of the control of this system.

2. Setting of the Invention

A multidatabase system (MDBS) provides uniform user query access to one or more heterogeneous database management systems that may be located at different sites or at one site. In using an MDBS, a user is not required to know the location or the characteristics of the data needed for the transaction. Also, the MDBS query and data access language allows the user to access multiple preexisting databases in a single query using a predefined global query language.' Therefore, the knowledge of the intriacacies of each of the local database management systems supporting the data is not required. This universality of access to databases is a feature of Amoco Production Company's Distributed Database System (ADDS), as described in "ADDS—Heterogeneous Distributed Database System," by Y. J. Breitbart and L. R. Tieman, *Distributed Data Sharing Systems*, North-Holland Publ., 1985.

It is preferable in using an MDBS that no modification of the local database management systems is required or permitted so that the autonomy of the local databases is preserved and applications that are locally written still are able to run even in the presence of the MDBS. Modifying the DBMS's to interact with the MDBS could hinder the developers of the MDBS when support for a new DBMS is added. Also, changes to the DBMS software are oftentimes not permitted under certain vendor supplied software license agreements and, more importantly, these changes can create problems with the maintenance of user applications as well as with the maintenance of the DBMS software.

Since changes to the local database software are not permitted, the DBMS's should treat the global subtransactions and local transactions equally and, in addition, the local DBMS's should be able to coordinate their operations without knowledge of other DBMS's involved and without knowledge of the MDBS. Local autonomy also requires that local DBMS maintenance and performance changes be allowed to continue as if the MDBS does not exist.

In general, a DBMS may utilize one of a variety of different data models such as hierarchical, relational, network. A variety of different local area and wide area communication networks can be used to communicate with the DBMS's. The MDBS must be able to support access to the DBMS regardless of the data model and communications facilities utilized.

The absence of cooperative action among the local DBMS's creates several difficult problems in maintaining database consistency of semantically related data located at different data sites and managed by different DBMS $\propto$ s. Among these problems are maintaining global database consistency in the absence of information about transactions executing at other local sites, preventing and/or detecting deadlock situations in the execution of global and local transactions, generating and executing subtransactions based on global transactions submitted to the MDBS, maintaining global transaction and subtransaction atomicity, preserving the relative execution order of the transactions, as determined by the MDBS, at local sites.

In a multidatabase system where only global transactions are permitted, homogeneous distributed database management system concurrency control techniques can be employed. However, from a practical standpoint, this restriction significantly diminishes the usefulness of the system, i.e., only global transactions are permitted. It is preferable for the users of the system to be allowed to submit transactions outside of the control of the MDBS. However, permitting the execution of some types of local transactions may create semantic inconsistencies in the global database.

An example of a local transaction that creates a semantic inconsistency is described herein. For a multidatabase system that supports access to data located at sites A and B, site A supports access to data items x and y and site B supports access to data items x and z. Assuming that x is a replicated data item in the global database and initially the value of x is the same at both sites, if a local transaction is submitted at site A and changes the value of x, then the global database is no longer consistent because the value of x is not the same at both sites. Therefore, it is clear that the execution of some types of local transactions in a multidatabase environment should be prohibited. The inventors hereof know of no other system or method for permitting the correct execution of multiple concurrent transactions, each containing one or more read and/or write operations, in a heterogeneous database system.

Various forms of concurrency controls have been developed for database management systems, including one described in the article "Architecture of the Network Data Management System" by Staniszkis, et al. In the Network Data Management System (NDMS), Staniszkis discusses updating heterogeneous databases, however, there is no disclosure or suggestion within Staniszkis for concurrency control to permit the correct execution of multiple concurrent transactions.

Another system described in "Sirius Systems for Distributed Database Management" by Litwin, et al., and "Heterogeneity in the Distributed Database Management Systems Sirius-Delta" by Ferrier, et al., discloses updating data within distributed databases. However, the Sirius-Delta system must modify each local DBMS and use a prior concurrency control. There is no disclosure or suggestion for the Sirius-Delta system to not require altering each of the local database management systems, or for permitting the correct execution of multiple concurrent transaction in a heterogeneous database system, including independent execution of local transactions at each site.

U.S. Pat. No. 4,627,019 discloses a concurrency control that only works with a local relational database management system. There is no disclosure or suggestion within U.S. Pat. No. 4,627,019 of a concurrency control to be used with a heterogeneous distributed database system, further, that can be used with any nonrelational database management system if the user so desires.

There is a need for a concurrency control method and system for permitting the correct execution of multiple concurrent transactions in a heterogeneous database system without any modifications to the local database management systems, and which can be used with any desired database management system.

SUMMARY OF THE INVENTION

The present invention has been contemplated to overcome the foregoing deficiencies and meet the above-described needs. The present invention is a method and related system of concurrency control for permitting the correct execution of multiple concurrent global transactions, each comprising one or more read and/or write operations, in a distributed heterogeneous database system along with independent concurrent execution of local transactions at each site. Within the method of the present invention, upon the receipt of a read operation request, the individual sites that contain the data needed for the read operation are determined. If the transaction that includes the read operation request has processed a previous operation at any of the sites containing the data, then the read operation is performed at one of these sites. If no previous operations have been processed at any of the sites needed for the read operation, i.e., no server has been allocated to any of the sites, a site is selected and it is determined if a site cycle occurs because of the selection of the specified site. If a site cycle oes occur, then another site from the set of possible sites is selected and again, it is determined if a site cycle occurs. If no site cycle occurs at one of the sites, then the read operation is performed at that selected site. If a site cycle occurs for all of the possible sites, then the transaction is rolled back and eventually restarted.

In a write operation, all sites are determined that contain the data needed for the write operation. It is determined if a site cycle occurs because of the addition of any of the necessary sites and if no site cycle occurs, then the write operation is performed at each of the selected sites. However, if a site cycle occurs, then the transaction is rolled back and eventually restarted.

By using the method and system of the present invention, very complex global and local transactions can be performed in such a way that no global inconsistency of semantically related data can occur. Therefore, a user is assured of the correct execution of the transaction without needing to know complex logic rules needed to execute the transaction.

BRIEF DESCRIPTION OF THE DRAWINGS

FIG. 21 is an illustration of site graphs used in the present invention.

DETAILED DESCRIPTION OF THE PREFERRED EMBODIMENT

The present invention provides a concurrency control method and related system for permitting the correct execution of a concurrent mix of MDBS and local transactions, each comprising one or more read and/or write operations, within a heterogeneous multisite database system.

Within the present invention, the terms "heterogeneous database" and "multidatabase" are used synonymously.

Figure 1:
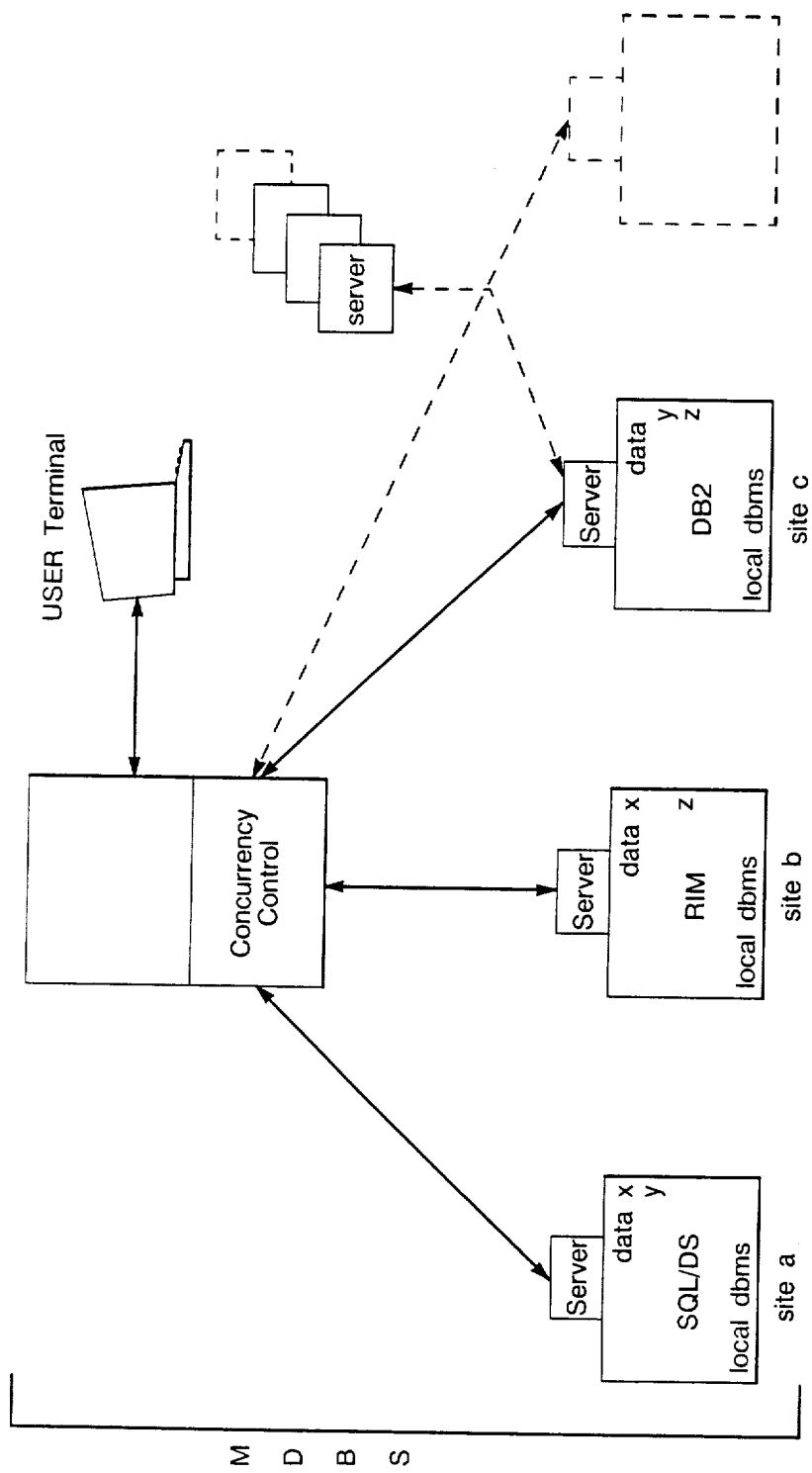
FIG. 1 is a graphical representation of a distributed heterogeneous database system, as used in the present invention.

For the understanding of the present invention, the following definitions and examples are given. A multidatabase system consists of several databases or files that are managed by possibly different local DBMS's such as SQL/DS, RIM, DB2, IMS, ORACLE, etc. The term "distributed" means that the local database management systems may be in different locations. A typical multidatabase system (MDBS) architecture is shown in FIG. 1.

The MDBS manages a global database. The term "global database" means a set of data items denoted by x, y, z, . . . along with the set of local sites where semantically identical data items are located. The MDBS processes global operations defined on a global database. Among those are read and write operations. Read(x), denoted by r(x), returns the current value of a data item from a global database. Write(x), denoted by w(x), assigns a new value to the data item x. The term "global transaction" means a sequence of global operations each performed on data items from a global database. Each global operation of a global transaction is called an "atomic action" of the transaction. Each global transaction is executed atomically. That is, either it runs to completion or it does not run at all. We will also assume in this invention that if a global transaction reads and writes data item x, then the read operation occurs before the write operation and each data item is read or written by a global transaction only once.

The following example is provided to clarify the above definitions.

EXAMPLE 1

A global database contains a set of data, denoted by x, y, z and a set of global transactions is:

Transaction $T_1$: $r_1(x)$ $r_1(y)$ $w_1(y)$
Transaction $T_2$: $w_2(y)$ $r_2(z)$ $w_2(z)$
Transaction $T_3$: $r_3(x)$ $r_3(y)$ $r_3(z)$ The set of data items read by a global transaction T will be called the read set of T and denoted by rs(T). The set of data items that are written by a global transaction T will be called the write set of a transaction T and denoted by ws(T). A global transaction will be called a write transaction if its write set is non-empty, otherwise it is called a read transaction. In Example 1, transactions $T_1$ and $T_2$ are write transactions and transaction This is a read transaction.

The sites of the multidatabase system are a collection of data locations possibly distributed denoted by a, b, c, . . . A data item is replicated if it is located at more than one site. If a data item is located only at one site it is called a nonreplicated data item. If a data item x is replicated at sites a, b, . . . , then a copy of x at site a is denoted as $x_a$, at site b as $x_b$, etc. A local database at site i is a collection of data items located at sit i: xi, yi, . . .

Each local site has its own local database management system (DBMS) that processes local database operations.

Among the local operations defined on the local site are read($x_a$), denoted by r($x_a$), which returns the current value of the data item x at site a, and write($x_a$), denoted by w($x_a$), which changes the current value of the data item x only at site a.

A local transaction is a sequence of local read and write operations defined on a local database (i.e., database located at a single site).

The set of data items read by a local transaction T will be called the read set of T and denoted by rs(T). The set of data items that are written by a local transaction T will be called a write set of a transaction T and denoted by ws(T). A local transaction will be called a write transaction if its write set is nonempty, otherwise it is called a read transaction. A local write transaction T will be called a singular transaction if its write set consists of only nonreplicated data items.

It is assumed that each local DBMS guarantees correct execution of a system of local transactions under its control. This means that if a local database was consistent before the execution of a system of local transactions it will remain consistent after the completion of those transactions.

Within the scope of this invention the only local transactions that will be permitted at the local sites outside of the control of the MDBS will be read transactions and singular write transactions. This restriction on local transactions is necessary to maintain the consistency of the replicated data items in a global database in the presence of any other global transactions.

Within the present invention, when the user submits a global transaction to the MDBS, the user generates a transaction using the global query language. The MDBS then determines the proper execution of the transaction and creates subtransactions that are to be sent to the local sites for execution. Let x be a replicated data item with copies located at sites a, b, c, . . . When a global operation r(x) is submitted to the MDBS, it is sufficient to read a copy of x from any site that contains x. On the other hand, when a global operation w(x) is submitted to the MDBS, it is required to write a new value of x at each site that contains a copy of x.

The more formal relationship between global transaction and subtransactions that the MDBS creates can be established as follows.

We define a translation operator F(t), where t is a sequence of global operations. The translation operator F maps each global read operation r(x) into a local read operation r($x_a$), and each global write operation into local write operations w($x_{a1}$), . . . , w($x_{am}$) for all copies of the data item x located at sites $a_1$, . . . , $a_m$.

We also define a projection operator $P_a$(s), where s is a sequence of local operations at possibly different sites. The projection operator $P_a$ generates a sequence of local operations s defined only on data items at the site a.

Given a global transaction T, the MDBS generates a system of local subtransactions by first applying the operator F to obtain a system of local operations on local data items that are to be executed by the DBMS's and then the MDBS applies the projection operator $P_a$ for each site that contains copies of data items read or written by transaction T. It is important to observe that for each site only one local subtransaction is generated for a given global transaction. To clarify the concepts introduced, let us consider the global database of FIG. 1 along with the global transaction $T_2$ from Example 1. An application of the translation operator F to $T_2$ from above may generate the following sequence of local operations:

$$w_2(y_a)\ w_2(y_c)\ r_2(z_b)\ w_2(z_b)$$

An application of the projection operator P for sites a, b and c will generate the following sequence of subtransactions to be executed at sites a, b, and c.

Subtransaction at site a: $w_2(y_a)$;
Subtransaction at site b: $r_2(z_b)\ w_2(z_b)$;
Subtransaction at site c: $w_2(y_c)\ w_2(z_c)$;

As stated earlier, the requirement for concurrency control of the MDBS is to ensure that a system of global transactions along any combinations of local read and singular write transactions will retain global database consistency. In the framework of this invention it means that any execution of a set of global transactions along with local read and singular write transactions is equivalent to some serial execution of all these transactions.

The approach to global database consistency taken in this invention is to guarantee that no situation can arise during the execution of global and permitted local transactions that may potentially create global database inconsistency. The notion of a site graph plays a central role in further discussion on how the MDBS is able to maintain global database consistency.

Figure 2:
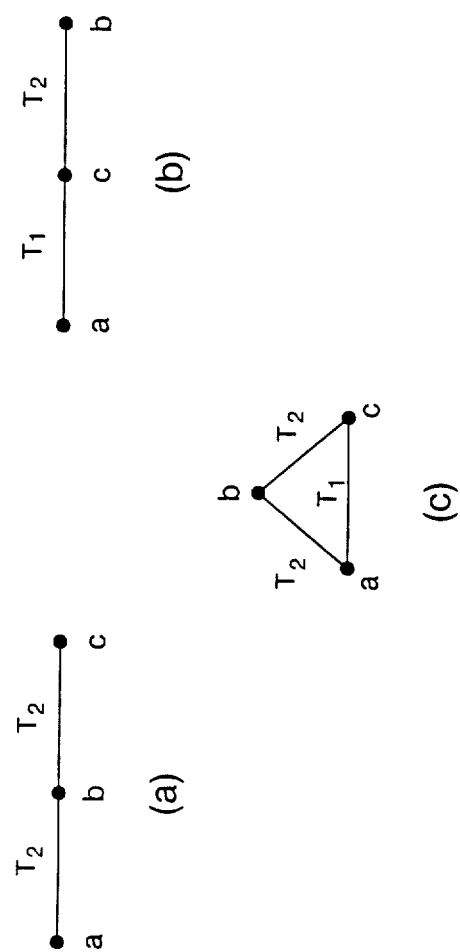

Let us first define a site graph of a global transaction T. Applying a translation operator F to a global transaction T we obtain a set of local operations to be executed at local sites. All sites of F(T) are connected in any order into a line graph, which is a graph defined on sites as its nodes and all sites belong only to one path and no site appears more than once in the graph. Each edge of this graph connects two sites (nodes) and is marked by a transaction id. For example, a site graph of the transaction $T_2$, from Example 1, is shown in FIG. 2a.

Given a set of global transactions, applying the translation operator F to each one of them and combining their respective site graphs we obtain a site graph of the system of global transactions for a given application of the translation operator F. Since the notion of a site graph is central to this invention, let us illustrate this notion with the following example.

EXAMPLE 2

Given the global database shown in FIG. 1, let us define the following global transactions $T_1$ and $T_2$ as follows.

Transaction $T_1$: $r_1(x)\ w_1(y)$
Transaction $T_2$: $r_2(y)\ w_2(z)$

Applying the translation operator F we may obtain the following system of local operations for each transaction:

F($T_1$): $r_1(x_a)\ w_1(y_a)\ w_1(y_c)$
F($T_2$): $r_2(y_c)\ w_2(z_b)\ w_2(z_c)$

The site graph of $T_1$ and $T_2$ for the above application of F is shown in FIG. 2b.

For another application of F to $T_1$ and $T_2$ we may obtain the following system of local operations for each transaction:

F($T_1$): $r_1(x_a)\ w_1(y_a)\ w_1(y_c)$
F($T_2$): $r_2(y_a)\ w_2(z_b)\ w_2(z_c)$ application The site graph of $T_1$ and $T_2$ for the latter application of F is shown in FIG. 2c.

The term "site cycle" in the context of this application means a loop in the site graph for some application of the translation operator F to a system of global transactions. For example, the site graph of FIG. 2c contains a site cycle, while the site graph of FIG. 2b does not. It is important to observe that a site graph of a single global transaction may not contain a site cycle as follows from the definition of a site graph of a global transaction.

Within the present invention, the existence of a site cycle, determined by the site graph, could cause global database inconsistency while executing read and write operations of global and permitted local transactions. On the other hand, the absence of site cycles in the site graph will guarantee the correct execution of any mix of global transactions and permitted local transactions. If a site cycle exists for all applications of function F to a transaction T, at least one of the global transactions involved in the site cycle needs to be rolled back and eventually restarted.

The term "server" is a process that translates global read and write requests addressed to a local DBMS into the language of the local DBMS. Each global transaction T may have only one server allocated per local site by the MDBS to execute a subtransaction that is generated by P(F(T)). The server is allocated by the MDBS and is active until T is completed at all sites.

The MDBS processes read and write requests from a system of global transactions. Generally, if a read global data item request is submitted to the MDBS, then the MDBS determines at what site the data item is located. If the data item is located at a site that has already processed read or write requests for the same global transaction then this site receives the current read request, thereby preventing site cycles in the site graph.

If, however, no previous operation has been executed at any site that contains a required data item, then all sites must be examined individually, to determine whether the allocation of a new site for the transaction may cause a site cycle in the site graph maintained by the MDBS.

If there is a site that contains the requested data item and its addition to the site graph does not cause a site cycle, then this site is selected for the execution of the read operation of the transaction and a new server for this site is allocated by the MDBS to execute the read request from the global transaction and possibly other operations that could be determined by the MDBS at later stages of the execution of this global transaction.

If, however, there is no site containing the requested data item that can be added to the site graph without causing a site cycle, the transaction is rolled back, since it potentially may cause global database inconsistency, and is restarted at some later time.

If a write request is submitted to the MDBS, it also determines all of the sites where the data item is located. If the addition of all these sites to the site graph does not cause a site cycle in the site graph, then a request is sent to the local sites for the execution of the operation. If some of these sites do not have servers allocated for the transaction, the MDBS allocates the required servers and submits the write requests for execution.

If the addition of the sites that contain the data item creates a site cycle, then the transaction is rolled back and is restarted at some later time.

Figure 3:
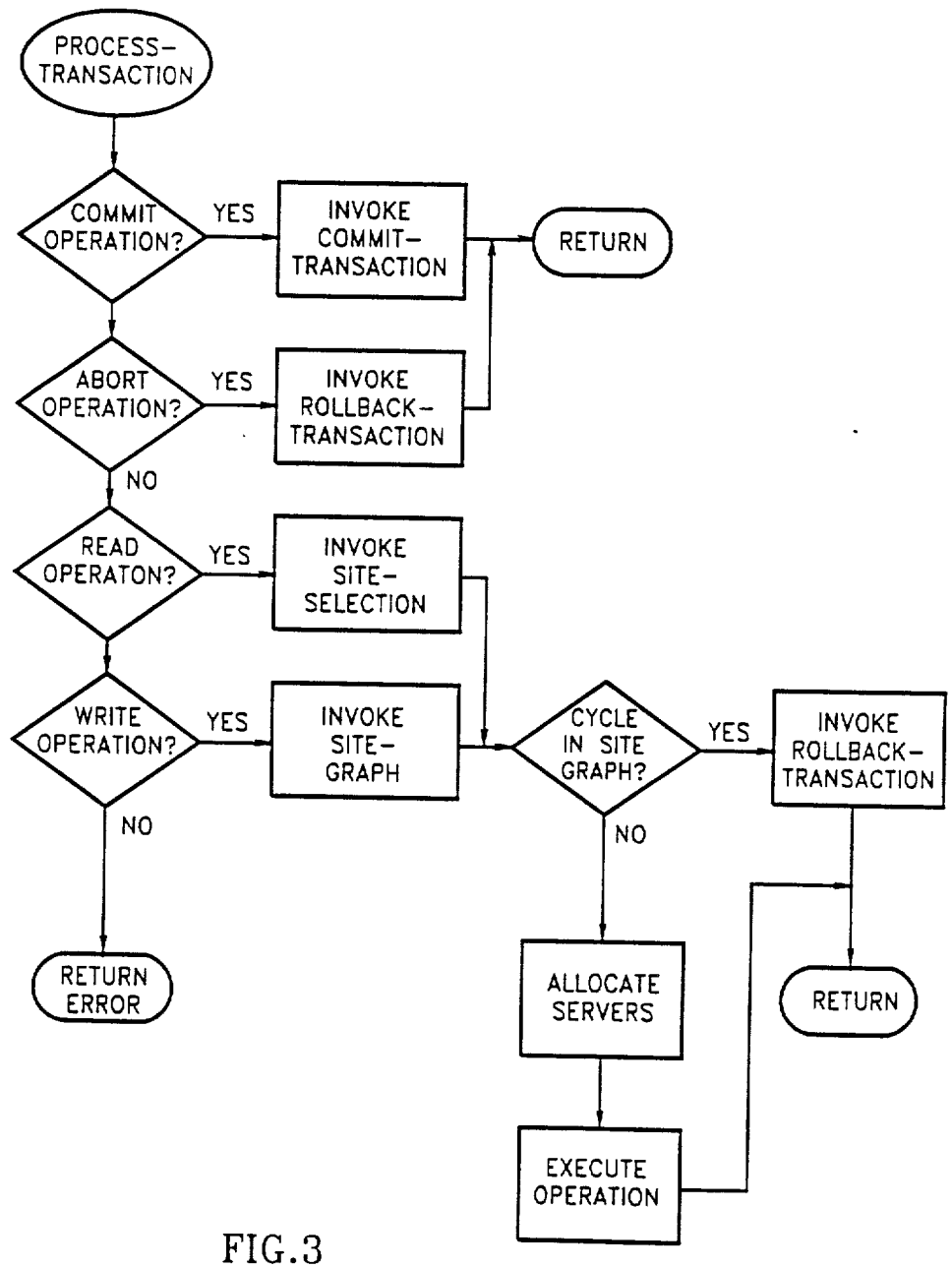
FIG. 3 is a block diagram of a Process Transaction in accordance with one embodiment of the present invention.

The Process-Transaction algorihthm described in Table 1 and shown in FIG. 3 controls the flow of transaction processing in the multidatabase system of the present invention. The algorithm synchronizes the execution of the global tranactions in a manner that maintains global database consistency and the steps performed as each global operation enters the database system from the global transaction are described below. The major components of the transaction processing algorithm are described in the following paragraphs.

Figure 4:
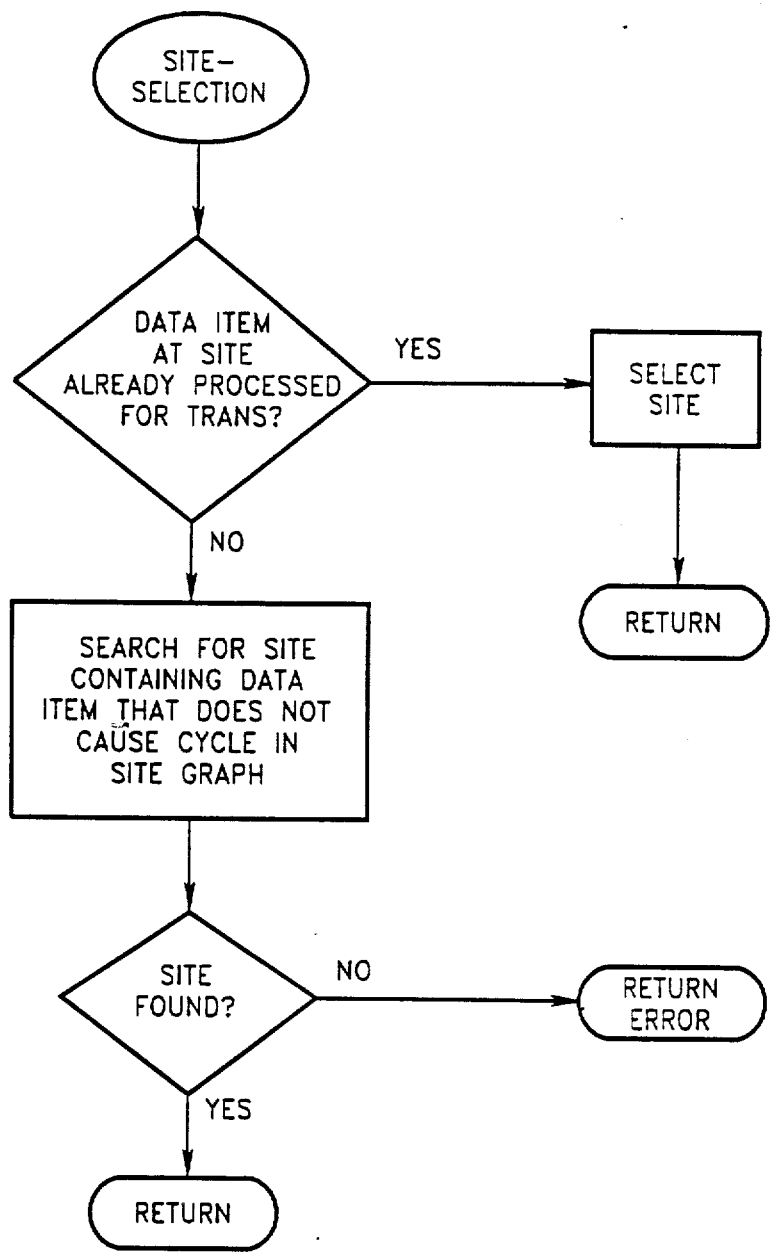
FIG. 4 is a block diagram of a Site Selection used with the process of FIG. 3.

TABLE 1 procedure PROCESS_TRANSACTION (T, op, x, Q, n, S):
 begin
  comment The PROCESS_TRANSACTION algorithm synchronizes the execution of global transactions in a manner that maintains global database consistency.
  let T be the global transaction from which the global operation is derived, op be the global operation to be performed, x be the global data item referenced by op, Q be the set of sites that contain a copy of x, n be the number of elements in Q, and S be the sites currently participating in the execution of T.
  if op='COMMIT' then
   begin
   invoke COMMIT_TRANS (T)
   return
   end
  if op='ABORT' then
   begin
   invoke ROLLBACK_TRANS (T)
   return
   end
  if op='READ' then
   invoke SITE_SELECTION (T, Q, n, S)
  else
   comment op='WRITE'
   invoke SITE_GRAPH (T, Q, n, S)
   if the site graph contains a cycle then
    begin
    invoke ROLLBACK TRANS (T)
    return
    end
   if Q is not a subset of S then comment The number of new servers allocated is n minus the number of elements in {Q intersect S}.
    allocate the appropriate number of servers to process the current operation
   send the global operation (T, op, x) to the servers allocated to transaction T for the sites in Q.
 end The Site-Selection algorithm (Table 2) shown in FIG. 4 selects an appropriate site for reading the value of a replicated data item. Site selection can prevent the unnecessary rolling back of one or more global transactions because of a cycle in the site graph.

TABLE 2 procedure SITE_SELECTION (T, Q, n, S):
 comment The SITE SELECTION algorithm selects an appropriate site for reading the value of a replicated data item.
 let T be the global transaction from which the global operation is derived, Q be the set of sites that contain a copy of the data item, n be the number of elements in Q, and S be the sites currently participating in the execution of T.
 if {Q intersect S} is not empty then
  begin

```
select a site s from {Q intersect S} 9
    n←1
    Q←s
    end
else
    begin
    for i←1 step 1 while i<=n do
        begin
        select site Q(i)
        invoke SITE_GRAPH (T, Q(i), 1, S)
        if the site graph is acyclic then
            begin
            n←1
            Q←Q(i)
            return
            end
        if i<n then
            delete the edge adjust added to the site graph
        end
    end
end
```

Site-Graph algorithm (Table 3)

Figure 5:
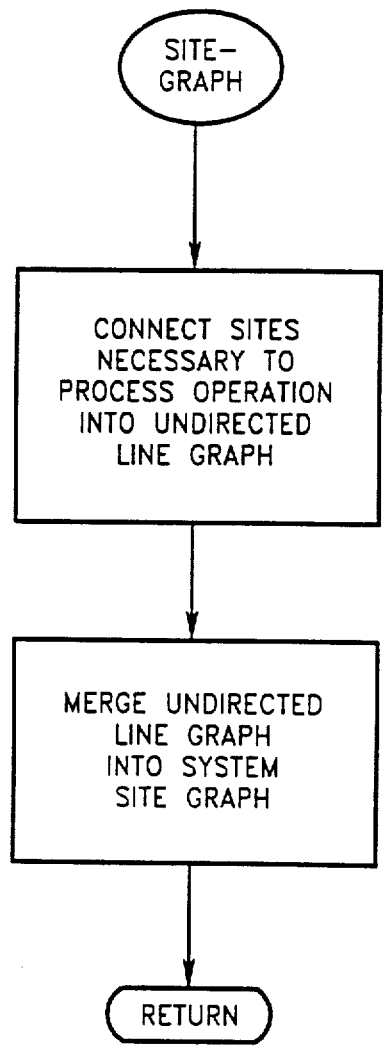
FIG. 5 is a block diagram of a Site Graph used in the process of FIG. 3.

The Site-Graph algorithm (Table 3) show in FIG. 5 specified sites for a global transaction to the site graph. Maintenance of the site graph alerts the multidatabase system to the possibility of a deadlock or inconsistency condition. Cycles in the site graph can be detected by performing a depth first traversal of the graph and checking for the existence of any "back edges".

TABLE 3

```
procedure SITE_GRAPH (T, Q, n, S):
    begin
    comment The SITE_GRAPH algorithm adds the
        specified sites for a global transaction to the site
        graph.
    let T be the global transaction from which the global
        operation is derived, Q be the set of sites that con-
        tain a copy of the data item, n be the number of
        elements in Q, and S be the sites currently partici-
        pating in the execution of T.
    delete the sites from Q that are also in S and adjust n
        accordingly
    if n=0 then
        return
    comment If n>1, add an edge with label T between
        each pair of sites Q(i) and Q(j), where i=1, ...,
        n-1, and j=i+1.
    add the sites in Q to the site graph for transaction T
    if set S is not empty then
        begin
        let S(i) be the last site in S that was added to the site
            graph for transaction T
        add edge (S(i), Q(l)) to the site graph for transac-
            tion T
        end
    end
```

Figure 6:
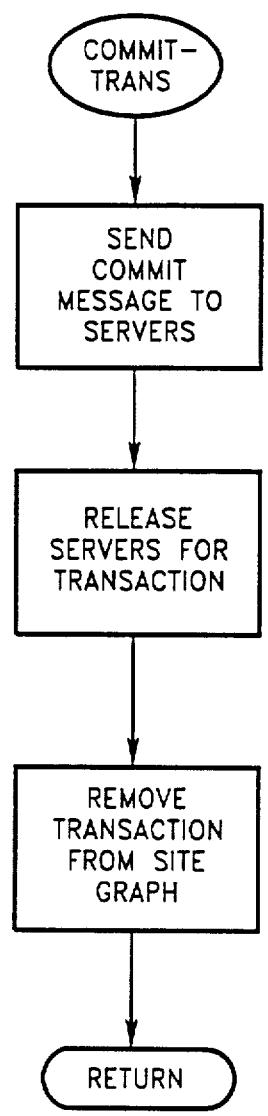
FIG. 6 is a block diagram of a Commit Transaction used with the process of FIG. 3.

The Commit-Transaction algorithm (Table 4) shown in FIG. 6 commits the updates performed by the global transactions on the global database. A two-phase commit protocol between the servers and the local databases is used within the present invention.

TABLE 4

```
procedure COMMIT_TRANS (T):
```

```
    comment The COMMIT_TRANS algorithm com-
        mits the updates performed by the specified trans-
        action to the global database.
    let T be the global transaction to be committed.
    send a 'COMMIT' message to all servers currently
        allocated to T
    comment The servers use a two-phase commit proto-
        col to apply the updates to each of the local data-
        bases.
    deallocate the servers from transaction T
    if the end time for T does not fall between the start
        and
        end time of any other transaction in the site graph
        then
        delete the nodes and edges for T from the site
            graph else
        transaction T must remain in the site graph until the
            end time for T does not fall between the start and
            end time of any other transaction in the site
            graph
    end
```

Figure 7:
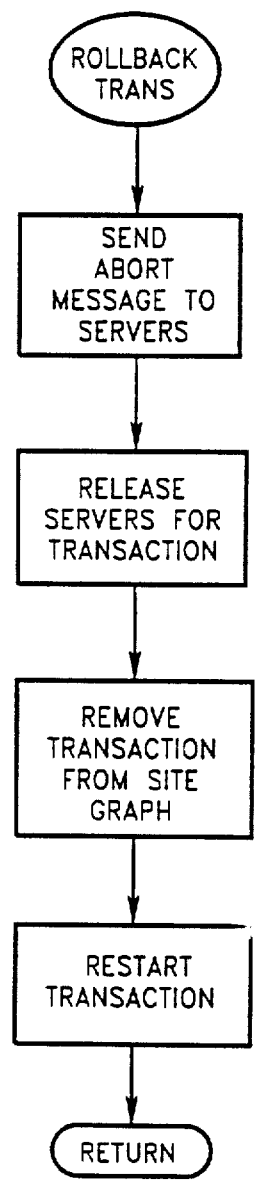
FIG. 7 is a block diagram of a Rollback Transaction used with the process of FIG. 3.

The Rollback-Transaction algorithm (Table 5) shown in FIG. 7 rolls back the results of the global transaction and cancels the effects of the specified global transaction on the global database. It may become necessary to roll back a transaction because of the existence of a site cycle.

TABLE 5

```
procedure ROLLBACK_TRANS(T):
    begin
    comment The ROLLBACK_TRANS algorithm
        rolls back the specified transaction and performs
        the necessary processing to cancel the effects of the
        transaction on the global database.
    let T be the global transaction to be rolled back.
    send an 'ABORT' message to all servers currently
        allocated to T
    comment The servers cancel all updates to the local
        data
    bases for transaction T and then terminate.
    deallocate the servers from transaction T.
    delete the nodes and edges for transaction T from the
        site graph.
    place transaction T on the restart queue.
    end
```

Wherein the present invention has been described in particular relation to the examples herein and drawings attached hereto, it should be understood that other and further modifications, apart from those shown or suggested herein, may be made within the scope and spirit of the present invention.

What is claimed is:

1. A concurrency control method for permitting the correct execution of multiple concurrent transactions, each comprising one or more read and/or write operations, in a distributed heterogeneous database system, comprising:

(a) upon receipt of a read operation request, identifying the sites in the system that contain data needed for the read operation;

(b) determining if the transaction including the read operation request has processed a previous operation at any of the identified sites;

(c) for the condition of step (b) where a previous operation has been processed, perform the read operation;

(d) for the condition of step (b) where a previous operation has not been processed, select a site from the identified sites and determine if a site cycle occurs at the selected site;

(e) for the condition of step (d) where a site cycle occurs, select another site from the selected sites and redo step (d);

(f) for the condition of step (d) where no site cycle occurs at one of the sites, perform the read operation at that selected site; and (g) for the condition of step (d) where a site cycle occurs for all selected sites, cancel the transaction.

2. The method of claim 1 wherein step (a) further comprises accessing a data location directory within the system, and selecting the sites from the directory where needed data resides.

3. The method of claim 1 wherein step (b) further comprises determining if a server has previously been allocated to a particular selected site for a transaction.

4. The method of claim 1 wherein the performance of the read operation in step (c) further comprises, using a server, translating a request for data into the language of a selected local database management system, providing the value of the data to the server, and providing the data value to the MDBS system from the server.

5. The method of claim 1 wherein the step of determining if a site cycle occurs comprises processing a labeled undirected site graph to determine if more than one path exists between any two sites.

6. A concurrency control method for permitting the correct execution of multiple concurrent transactions, each comprising one or more read and/or write operations, in a heterogeneous distributed database system, comprising:

(a) upon receipt of a write operation request, identifying the sites that contain data needed for the write operation;

(b) determining if a site cycle occurs at any of the sites identified in step (a);

(c) for the condition of steps (b) where no site cycle occurs for any of the sites, perform the write operation at each of the sites; and (d) for the condition of step (b) where at least one site cycle occurs for the sites, cancel the transaction.

7. The method of claim 6 wherein step (a) further comprises accessing a data location directory within the system, and determining the sites from the directory where needed data resides.

8. The method of claim 6 wherein step (b) further comprises processing a labeled undirected site graph to determine if more than one path exists between any two sites.

9. The method of claim 6 wherein the write operation comprises using servers translating the write request into the language of the selected local database management systems, each at a selected site; having each server provide the specified data value to the local database management system; and having each local database management system replace a previous data value with the specified data value.

10. A concurrency control system for permitting the correct execution of multiple concurrent transactions, each transaction comprising one or more read and/or write operations, in a heterogeneous distributed database system, comprising:

(a) means for identifying the sites that contain data needed for a read operation;

(b) means for determining if the transaction containing the read operation request has processed a previous operation at any of the identified sites;

(c) means for performing the read operation; and (d) means for determining if a site cycle occurs for any of the selected sites.

11. A concurrency control system for permitting the correct execution of multiple concurrent transactions, each comprising one or more read and/or write operations, in a heterogeneous distributed database system, comprising:

(a) means for identifying the sites that contain data needed for a write operation;

(b) means for determining if a site cycle occurs for any of the sites identified; and (c) means for performing the write operation at each of the identified sites.

* * * * *

UNITED STATES PATENT AND TRADEMARK OFFICE
CERTIFICATE OF CORRECTION

PATENT NO. : 4,881,166

DATED : November 14, 1989

INVENTOR(S) : Glenn R. Thompson; Yuri J. Breitbart

It is certified that error appears in the above—identified patent and that said Letters Patent is hereby corrected as shown below:

Column 6, line 7, the equation "$w_2(y_a)w_2(y_c)r_2(z_b)w_2(z_b)$"

should read --$w_2(y_a)w_2(y_c)r_2(z_b)w_2(z_c)w_2(z_b)$--.

Signed and Sealed this

Fourth Day of December, 1990

Attest:

HARRY F. MANBECK, JR.

Attesting Officer     Commissioner of Patents and Trademarks